US009406076B1

(12) United States Patent
Agrawal et al.

(10) Patent No.: US 9,406,076 B1
(45) Date of Patent: Aug. 2, 2016

(54) AUTOMATIC VIRTUAL PHONE NUMBER POOL MANAGEMENT

(71) Applicant: Google Inc., Mountain View, CA (US)

(72) Inventors: Anurag Agrawal, Palo Alto, CA (US); Girish Baliga, San Jose, CA (US); Anshul Kothari, Sunnyvale, CA (US); Seung Yi, Mountain View, CA (US); Tao Huang, San Jose, CA (US)

(73) Assignee: Google Inc., Mountain View, CA (US)

( * ) Notice: Subject to any disclaimer, the term of this patent is extended or adjusted under 35 U.S.C. 154(b) by 342 days.

(21) Appl. No.: 14/087,504

(22) Filed: Nov. 22, 2013

(51) Int. Cl.
*G06Q 30/02* (2012.01)
*H04L 12/911* (2013.01)

(52) U.S. Cl.
CPC .......... *G06Q 30/0241* (2013.01); *H04L 47/828* (2013.01); *G06Q 30/0242* (2013.01); *G06Q 30/0246* (2013.01); *G06Q 30/0253* (2013.01); *G06Q 30/0277* (2013.01)

(58) Field of Classification Search
CPC . G06Q 30/241; G06Q 30/242; G06Q 30/246; G06Q 30/253; G06Q 30/277
See application file for complete search history.

(56) References Cited

U.S. PATENT DOCUMENTS

| | | | | |
|---|---|---|---|---|
| 6,393,117 B1 * | 5/2002 | Trell | ................. | H04M 3/42008 379/207.03 |
| 7,424,442 B2 * | 9/2008 | Wong | ..................... | G06Q 30/02 379/112.01 |
| 7,848,499 B2 * | 12/2010 | Michonski | ............. | G06Q 30/02 379/114.13 |
| 8,140,389 B2 * | 3/2012 | Altberg | .................. | G06Q 30/02 379/900 |
| 8,200,534 B2 * | 6/2012 | Wong | ..................... | G06Q 30/02 379/220.01 |
| 8,229,414 B1 | 7/2012 | Hilyard et al. | | |
| 8,265,609 B2 | 9/2012 | Deliwala et al. | | |
| 8,312,042 B2 | 11/2012 | Lebeau et al. | | |
| 8,504,426 B2 * | 8/2013 | Petta | ..................... | G06Q 30/02 705/14.73 |
| 8,577,016 B1 * | 11/2013 | Duva | ..................... | G06Q 10/00 379/201.01 |
| 8,619,952 B2 * | 12/2013 | Chatterjee | ......... | H04M 3/42059 379/90.01 |
| 8,634,526 B2 * | 1/2014 | Ueshima | ................ | G06Q 30/02 379/114.13 |
| 8,700,461 B2 * | 4/2014 | Wong | ..................... | G06Q 30/02 379/220.01 |
| 8,725,561 B1 * | 5/2014 | Chatterjee | .......... | G06Q 30/0242 705/14.1 |
| 8,732,322 B1 * | 5/2014 | Agrawal | ............ | G06Q 30/0251 705/14.45 |
| 8,863,167 B2 * | 10/2014 | Reilly | ................ | H04N 7/17318 725/11 |

(Continued)

OTHER PUBLICATIONS

Wikipedia.com, "Call-tracking software," Feb. 16, 2014, [Retrieved on Feb. 18, 2014]. Retrieved from the internet: URL<http://en.wikipedia.org/wiki/Call-tracking_software>, 5 pages.

(Continued)

*Primary Examiner* — Jimmy H Tran
(74) *Attorney, Agent, or Firm* — Fish & Richardson P.C.

(57) ABSTRACT

Methods, systems, and apparatus include computer programs encoded on a computer-readable storage medium for dynamic contact information assignment. A pool of telephone numbers is assigned to a pool manager. The pool manager allocates subsets of the telephone numbers to a plurality of allocators that are each responsible for allocating telephone numbers to an associated group of content sponsors. An allocator can determine an allocation of a subset of the telephone numbers for distribution among the content sponsors associated with the allocator. Pools of telephone numbers can be created that are each associated with a respective content sponsor associated with the allocator. One or more telephone numbers can be reclaimed from a pool. A reclaimed telephone number can be assigned by the allocator into either other pools associated with the allocator or back to the pool manager for allocation to other allocators.

20 Claims, 9 Drawing Sheets

(56) References Cited

U.S. PATENT DOCUMENTS

| | | | | | |
|---|---|---|---|---|---|
| 9,131,069 | B2* | 9/2015 | Chau | | H04M 3/42008 |
| 9,220,000 | B1* | 12/2015 | Youngs | | H04W 4/12 |
| 2005/0251445 | A1* | 11/2005 | Wong | | G06Q 30/02 705/14.69 |
| 2006/0177029 | A1* | 8/2006 | Dotan | | H04M 15/7655 379/114.01 |
| 2007/0064889 | A1* | 3/2007 | Michonski | | G06Q 30/02 379/112.01 |
| 2007/0121848 | A1* | 5/2007 | Faber | | G06Q 30/02 379/114.13 |
| 2007/0124206 | A1* | 5/2007 | Faber | | G06Q 30/02 705/14.46 |
| 2007/0124207 | A1* | 5/2007 | Faber | | G06Q 30/00 705/14.52 |
| 2007/0226061 | A1 | 9/2007 | Chen et al. | | |
| 2008/0126209 | A1* | 5/2008 | Wong | | G06Q 30/02 705/14.69 |
| 2008/0275785 | A1* | 11/2008 | Altberg | | G06Q 30/02 705/14.54 |
| 2009/0282433 | A1* | 11/2009 | Petta | | G06Q 30/02 725/32 |
| 2011/0107362 | A1* | 5/2011 | Reilly | | H04N 7/17318 725/23 |
| 2011/0166938 | A1* | 7/2011 | Deridder | | G06Q 30/0261 705/14.58 |
| 2012/0177189 | A1* | 7/2012 | Chatterjee | | H04M 3/4878 379/93.17 |
| 2013/0018712 | A1* | 1/2013 | Wong | | G06Q 30/02 705/14.4 |
| 2013/0197995 | A1* | 8/2013 | Skog | | H04M 3/2218 705/14.45 |
| 2014/0074596 | A1* | 3/2014 | Kolluri | | G06Q 30/02 705/14.45 |
| 2014/0162597 | A1* | 6/2014 | Chau | | H04M 3/42008 455/406 |
| 2015/0026717 | A1* | 1/2015 | Reilly | | H04N 7/17318 725/32 |
| 2015/0066633 | A1* | 3/2015 | Agrawal | | G06Q 30/0246 705/14.45 |

OTHER PUBLICATIONS

Harmony Tech, "Internet Marketing," [retrieved on Feb. 18, 2014]. Retrieved from the internet: URL<http://www.harmony-tech.com/internet-marketing/>, 2 pages.

* cited by examiner

300

Identify a pool of available telephone numbers that can be assigned dynamically to one or more impressions as they are received
302

Initially assign all of the available telephone numbers in the pool to a pool manager
304

Allocate, by the manager, initial subsets of the available telephone numbers to each of a plurality of allocator processes, including allocating a first subset to a first allocator process
306

Determine a first allocation of the first subset, the first allocation being distributed among the content sponsors associated with the first allocator process, creating first pools each associated with a respective content sponsor
308

Reclaim, based on one more criteria, one or more telephone numbers from a pool of the first pools forming reclaimed telephone numbers
310

Assign ones of the reclaimed telephone numbers by the first allocator process into either other pools of the first pools associated with the first allocator process or back to the pool manager for allocation to other allocator processes that are different from the first allocator process
312

FIG. 3

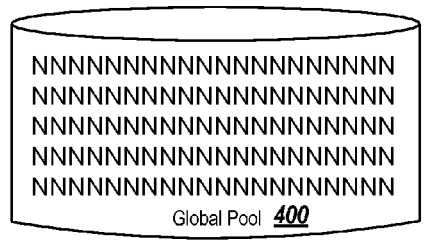
FIG. 4A
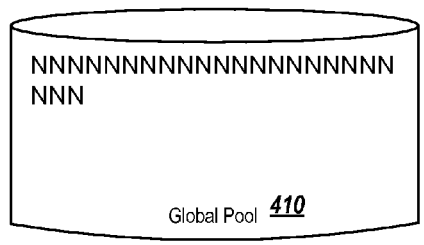
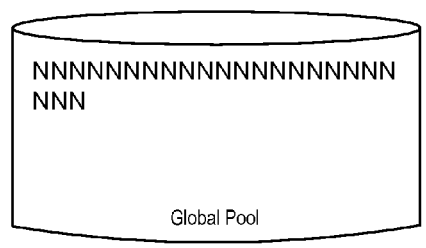
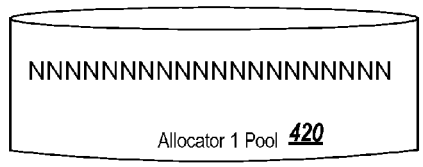
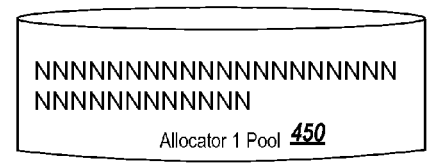
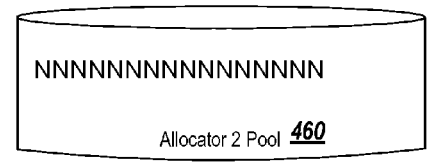
FIG. 4B
FIG. 4C

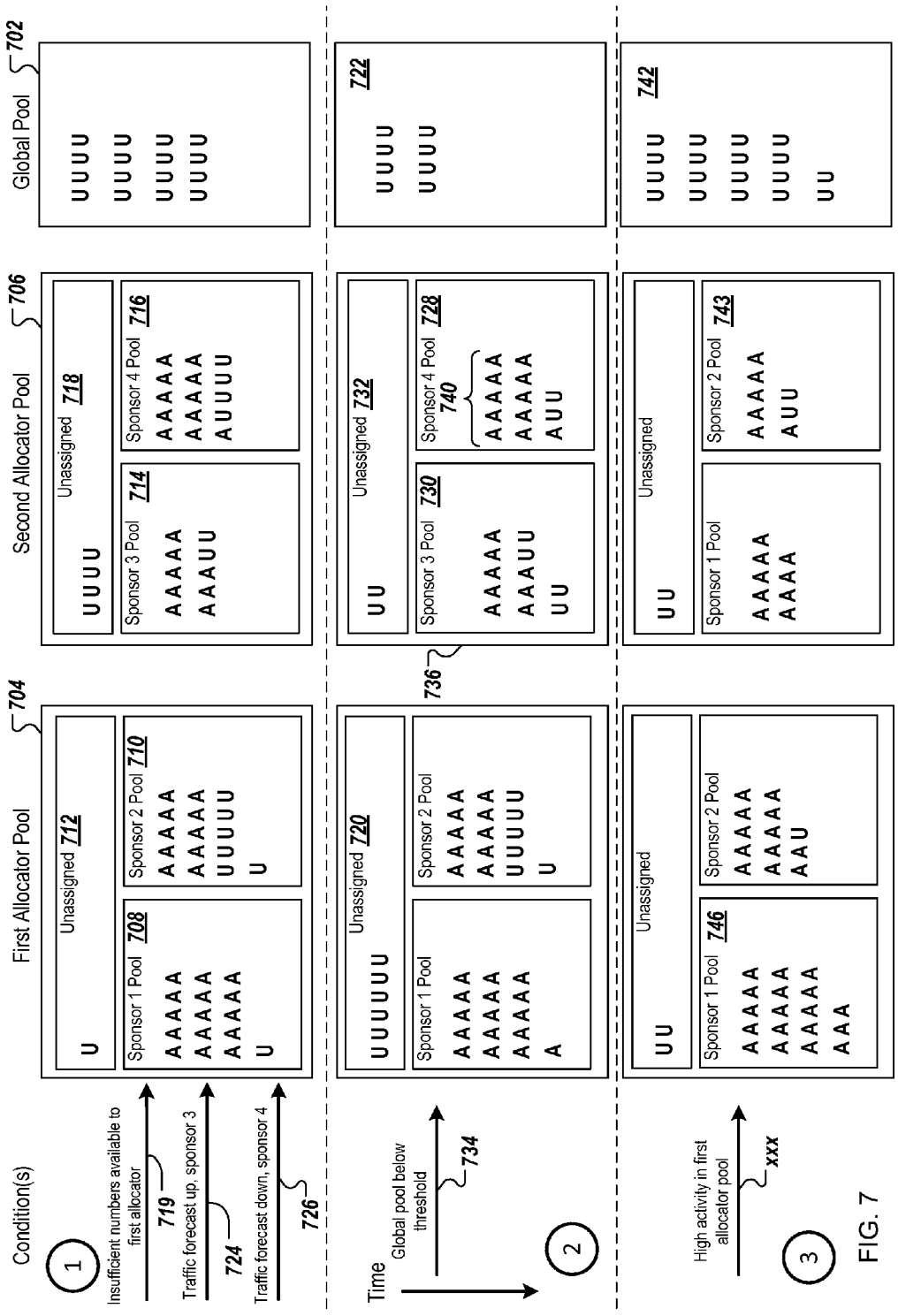

800

Provide an impression including providing a content item for presentation on a device associated with a user, the content item including a control for initiating a call to a content sponsor associated with the content item
802

Determine that the content sponsor is associated with a first pool
804

Assign a telephone number from the first pool to the content item, wherein assigning includes associating the telephone number with the content item
806

Receive an indication of an interaction with the control
808

Facilitate a connection between the user and the content sponsor based on the interaction
810

Store an association between an identifier associated with the user, the assigned telephone number and an identifier for the content sponsor such that future calls from the user to the telephone number can be routed to the content sponsor, even after the assigned telephone number has been returned to the first pool
812

Link an impression of the content item with the connection such that a report can be generated that shows an effectiveness of the impression of the content item
814

AUTOMATIC VIRTUAL PHONE NUMBER POOL MANAGEMENT

BACKGROUND

This specification relates to assignments of re-usable contact information.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through a reservation system or an auction. For example, content sponsors can provide bids specifying amounts that the sponsors are respectively willing to pay for presentation of their content. In turn, a reservation can be made or an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in methods that include a method for allocation and reclaiming of telephone numbers. The method comprises: identifying a pool of available telephone numbers that can be assigned dynamically to impressions as they are received, wherein once assigned, a telephone number from the available telephone numbers providing a link of a subsequent call to the telephone number with a presentation of content associated with a specific impression; initially assigning all of the available telephone numbers in the pool to a pool manager; allocating by the manager, initial subsets of the available telephone numbers to each of a plurality of allocator processes, each allocator process responsible for allocating telephone numbers to a group of content sponsors that are associated with a respective allocator process, wherein allocating by the manager includes allocating a first subset of the initial subsets to a first allocator process; determining, by one or more processors, a first allocation of the first subset, the first allocation being distributed among the content sponsors associated with the first allocator process, wherein the first allocation creating first pools each associated with a respective one of the content sponsors associated with the first allocator process; based on one more criteria, reclaiming one or more telephone numbers from a pool of the first pools forming reclaimed telephone numbers; and assigning ones of the reclaimed telephone numbers by the first allocator process into either other pools of the first pools associated with the first allocator process or back to the pool manager for allocation to other allocator processes that are different from the first allocator process.

In general, another aspect of the subject matter described in this specification can be implemented in computer program products. A computer program product is tangibly embodied in a computer-readable storage device and comprises instructions. The instructions, when executed by a processor, cause the processor to: identify a pool of available telephone numbers that can be assigned dynamically to impressions as they are received, wherein once assigned, a telephone number from the available telephone numbers providing a link of a subsequent call to the telephone number with a presentation of content associated with a specific impression; initially assign all of the available telephone numbers in the pool to a pool manager; allocate by the manager, initial subsets of the available telephone numbers to each of a plurality of allocator processes, each allocator process responsible for allocating telephone numbers to a group of content sponsors that are associated with a respective allocator process, wherein allocating by the manager includes allocating a first subset of the initial subsets to a first allocator process; determine a first allocation of the first subset, the first allocation being distributed among the content sponsors associated with the first allocator process, wherein the first allocation creating first pools each associated with a respective one of the content sponsors associated with the first allocator process; based on one more criteria, reclaim one or more telephone numbers from a pool of the first pools forming reclaimed telephone numbers; and assign ones of the reclaimed telephone numbers by the first allocator process into either other pools of the first pools associated with the first allocator process or back to the pool manager for allocation to other allocator processes that are different from the first allocator process.

In general, another aspect of the subject matter described in this specification can be implemented in systems. A system includes: a pool of available telephone numbers; a pool manager; and a plurality of allocator processes. The pool of available telephone numbers includes available telephone numbers that can be assigned dynamically to impressions as they are received and wherein once assigned, a telephone number from the available telephone numbers provides a link of a subsequent call to the telephone number with a presentation of content associated with a specific impression. A respective allocator process is configured to: allocate telephone numbers to a group of content sponsors that are associated with a respective allocator process, including determining an allocation of a subset of telephone numbers that are allocated to the respective allocator process, the allocation being distributed among the content sponsors associated with the respective allocator process and creating pools, each pool associated with a respective one of the content sponsors associated with the respective allocator process. The pool manager is configured to: identify the pool of available telephone numbers; initially assign all of the available telephone numbers in the pool to the pool manager; allocate initial subsets of the available telephone numbers to each of the plurality of allocator processes, including allocating a first subset of the initial subsets to a first allocator process; based on one more criteria, reclaim one or more telephone numbers from a pool of the pools associated with the first allocator process forming reclaimed telephone numbers; and assign ones of the reclaimed telephone numbers by the first allocator process into either other pools of the first pools associated with the first allocator process or back to the pool manager for allocation to other allocator processes that are different from the first allocator process.

These and other implementations can each optionally include one or more of the following features. The allocating by the manager of the initial subsets can be less than all of the available telephone numbers in the pool. The allocating by the manager of the initial pools can be based on a projected demand for each of the allocator processes. The allocating by the manager of the initial pools can be uniform across the allocator processes. The first allocation by the first allocator process to the group of content sponsors associated with the first allocator process can be less than all of the first subset. The first allocation by the first allocator process to the group of content sponsors associated with the first allocator process can be based on projected demand for each respective content sponsor. The first allocation by the first allocator process to the group of content sponsors associated with the first allocator process can be uniform across the content sponsors. More telephone numbers can be assigned to a pool of the first pools from the reclaimed telephone numbers. Each pool of the first pools can be monitored and a determination can be made as to when to reclaim telephone numbers based on a number of telephone numbers that are assigned in each respective pool. Each pool in the first pools can be monitored and more telephone numbers can be requested from the manager when insufficient numbers of reclaimed telephone numbers are available to the first allocator process for reassignment in the first pools. A pool in the first pools can be monitored and more telephone numbers can be requested from the manager when insufficient numbers of reclaimed telephone are available to the first allocator process for reassignment to the pool of the first pools or when overall pool activity is above a predetermined threshold for the first allocator process. Reclaiming a telephone number from the pool can include reclaiming a telephone number that is currently assigned and was assigned previously a longest time ago in the past relative to other assigned telephone numbers in the pool. An impression can be provided including providing a content item for presentation on a device associated with a user, the content item including a control for initiating a call to a content sponsor associated with the content item. A determination can be made that the content sponsor is associated with the first pool. A telephone number from the first pool can be assigned to the content item, wherein assigning can include associating the telephone number with the content item. An indication of an interaction with the control can be received. A connection between the user and the content sponsor can be facilitated based on the interaction. An association between an identifier associated with the user, the assigned telephone number and an identifier for the content sponsor can be stored such that future calls from the user to the telephone number can be routed to the content sponsor, even after the assigned telephone number has been returned to the first pool. An impression of the content item can be linked with the connection such that a report can be generated that shows an effectiveness of the impression of the content item. The first pool can include a plurality of telephone numbers which may or may not have been previously assigned to other content items associated with the content sponsor but are now available for assignment. The assigned telephone number can be returned back to the first pool after either a predetermined amount of time after assignment to a content item, or after a pre-determined amount of time after assignment without receipt of an interaction by a user. The assigning can occur after receiving the indication of the interaction with the control. The one or more criteria can include changes in demand, changes in forecasted traffic or both. The one or more criteria can include demand by a pool of the first pools for more telephone numbers wherein the demand is based on a threshold amount of telephone numbers in the pool of the first pools being already assigned.

Particular implementations may realize none, one or more of the following advantages. A user interaction with a content item can be associated with a call by a user to a phone number associated with the content item. A determination can be made that a call was generated as a result of an interaction with a content item rather than as a result of some other action. A content sponsor can receive a report which displays how many calls were generated from impressions of each content item in a content campaign. Calls can be mapped to content items even when the number of content items that can be associated with a call is at least an order of magnitude greater than the number of available telephone numbers.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flowchart of an example process for allocation and reclaiming of telephone numbers.

FIG. 4A illustrates a global pool of available telephone numbers.

FIGS. 4B and 4C each illustrate a global pool and first, second, and third allocator pools, managed by first, second, and third allocator processes, respectively.

FIG. 7 illustrates a global pool, a first allocator pool, and a second allocator pool in various states over time.

FIG. 8 is a flowchart of an example process for dynamic telephone number assignment

Like reference numbers and designations in the various drawings indicate like elements.

DETAILED DESCRIPTION

A content item that includes a control for initiating a call to a content sponsor associated with the content item can be provided for presentation on a device associated with a user. An indication of an interaction with (e.g., selection of) the control can be received. A determination can be made that the content sponsor is associated with a pool of contact information (e.g., telephone numbers) among multiple pools of contact information managed by an allocator process. For example, a telephone number from the pool associated with the content sponsor can be assigned to (e.g., associated with) the content item. A connection between the user and the content sponsor can be facilitated based on the interaction. An association between an identifier associated with the user device that was associated with the interaction, the assigned telephone number, and an identifier for the content sponsor can be stored such that future contact (e.g., calls) from the user using the contact information (e.g., calls to the telephone number) are routed to the content sponsor. An impression of the content item can be linked with the connection such that a report can be generated that shows an effectiveness of the impression of the content item.

For situations in which the systems discussed here collect information about users, or may make use of information about users, the users may be provided with an opportunity to control whether programs or features collect user information (e.g., information about a user's social network, social actions or activities, demographics, profession, a user's preferences, or a user's current location), or to control whether and/or how to receive content from the content server that may be more relevant to the user. In addition, certain data may be manipulated in one or more ways before it is stored or used, so that certain information about the user is removed. For example, a user's identity may be manipulated so that no identifying information can be determined for the user, or a user's geographic location may be generalized where location information is obtained (such as to a city, ZIP code, or state level), so that a particular location of a user cannot be determined. Thus, the user may have control over how information about the user is collected and used by a content server.

Figure 1:
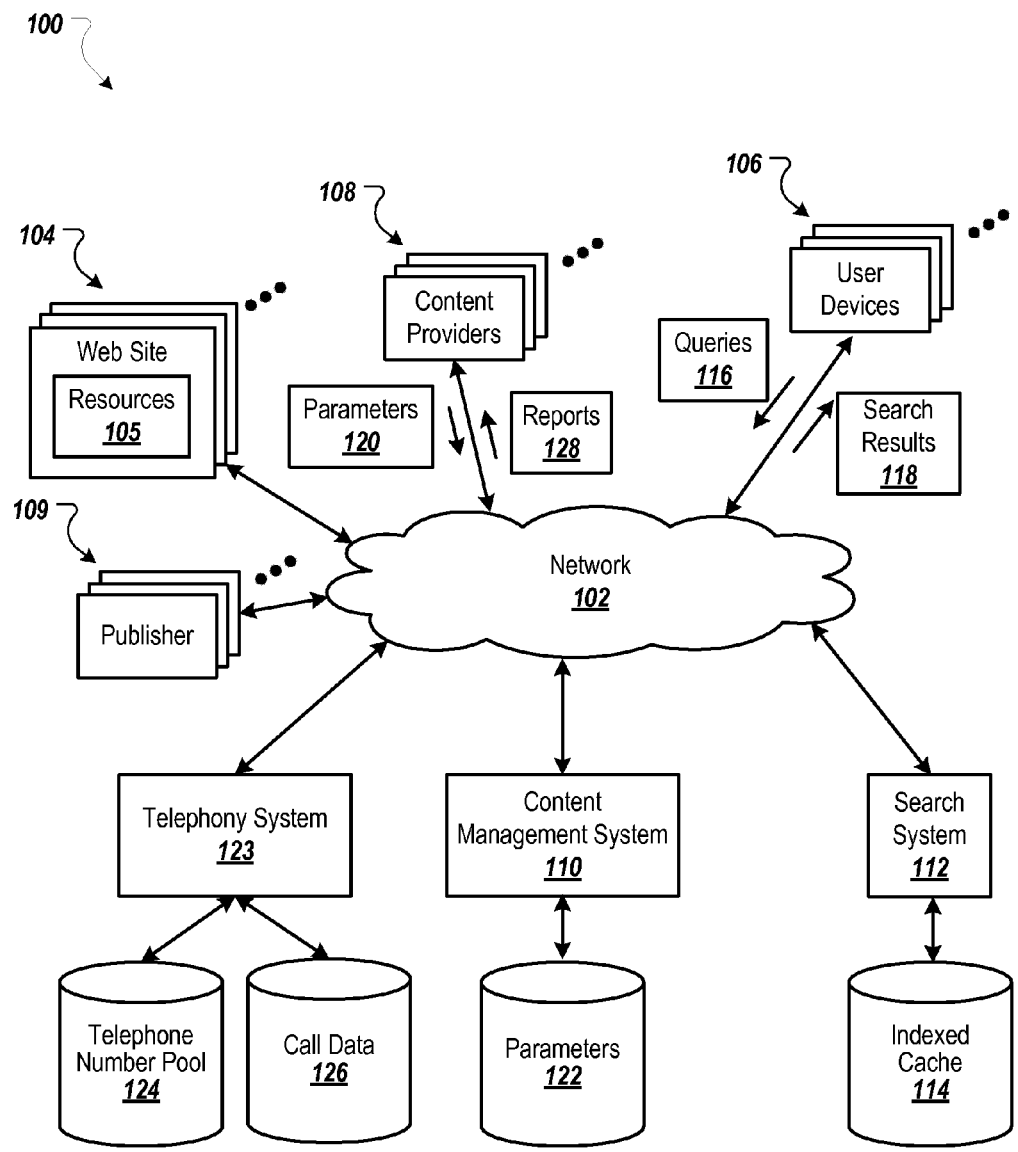
FIG. 1 is a block diagram of an example environment for providing content to a user.

FIG. 1 is a block diagram of an example environment 100 for providing content to a user. The example environment 100 includes a network 102, such as a local area network (LAN), a wide area network (WAN), the Internet, or a combination thereof. The network 102 connects websites 104, user devices 106, content providers 108, publishers, and a content management system 110. The example environment 100 may include many thousands of websites 104, user devices 106, and content providers 108. The content management system 110 may be used for selecting and providing content in response to requests for content. The content providers 108 can be, for example, advertisers. Other types of content providers are possible.

A website 104 includes one or more resources 105 associated with a domain name and hosted by one or more servers. An example website 104 is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources 105 include HTML pages, word processing documents, portable document format (PDF) documents, images, video, and news feed sources, to name only a few. The resources 105 can include content, such as words, phrases, videos, images and sounds, that may include embedded information (such as meta-information hyperlinks) and/or embedded instructions (such as scripts).

A user device 106 is an electronic device that is under control of a user and is capable of requesting and receiving resources 105 over the network 102. Example user devices 106 include personal computers, tablet computers, mobile communication devices (e.g., smartphones), televisions, set top boxes, personal digital assistants and other devices that can send and receive data over the network 102. A user device 106 typically includes one or more user applications, such as a web browser, to facilitate the sending and receiving of data over the network 102. The web browser can interact with various types of web applications, such as a game, a map application, or an e-mail application, to name a few examples.

A user device 106 can request resources 105 from a website 104. In turn, data representing the resource 105 can be provided to the user device 106 for presentation by the user device 106. User devices 106 can also submit search queries 116 to the search system 112 over the network 102. In response to a search query 116, the search system 112 can, for example, access the indexed cache 114 to identify resources 105 that are relevant to the search query 116. The search system 112 identifies the resources 105 in the form of search results 118 and returns the search results 118 to the user devices 106 in search results pages. A search result 118 is data generated by the search system 112 that identifies a resource 105 that is responsive to a particular search query 116, and includes a link to the resource 105. An example search result 118 can include a web page title, a snippet of text or a portion of an image extracted from the web page, and the URL (Unified Resource Location) of the web page.

The data representing the resource 105 or the search results 118 can also include data specifying a portion of the resource 105 or search results 118 or a portion of a user display (e.g., a presentation location of a pop-up window or in a slot of a web page) in which other content (e.g., advertisements) can be presented. These specified portions of the resource or user display are referred to as slots or impressions. An example slot is an advertisement slot.

When a resource 105 or search results 118 are requested by a user device 106, the content management system 110 may receive a request for content to be provided with the resource 105 or search results 118. The request for content can include characteristics of one or more slots or impressions that are defined for the requested resource 105 or search results 118. For example, a reference (e.g., URL) to the resource 105 or search results 118 for which the slot is defined, a size of the slot, and/or media types that are available for presentation in the slot can be provided to the content management system 110. Similarly, keywords associated with a requested resource or a search query 116 for which search results 118 are requested can also be provided to the content management system 110 to facilitate identification of content that is relevant to the resource or search query 116.

Based, for example, on data included in the request for content, the content management system 110 can select content items that are eligible to be provided in response to the request, such as content items having characteristics matching the characteristics of a given slot. As another example, content items having selection criteria (e.g., keywords) that match the resource keywords or the search query 116 may be selected as eligible content items by the content management system 110. One or more selected content items can be provided to the user device 106 in association with providing an associated resource 105 or search results 118.

In some implementations, the content management system 110 can select content items based at least in part on results of an auction. For example, content providers 108 can provide bids specifying amounts that the content providers 108 are respectively willing to pay for presentation of their content items. In turn, an auction can be performed and the slots can be allocated to content providers 108 according, among other things, to their bids and/or the relevance of a content item to content presented on a page hosting the slot or a request that is received for the content item. For example, when a slot is being allocated in an auction, the slot can be allocated to the content provider 108 that provided the highest bid or a highest auction score (e.g., a score that is computed as a function of a bid and/or a quality measure). When multiple slots are allocated in a single auction, the slots can be allocated to a set of bidders that provided the highest bids or have the highest auction scores.

In some implementations, some content providers 108 prefer that the number of impressions allocated to their content and the price paid for the number of impressions be more predictable than the predictability provided by an auction. For example, a content provider 108 can increase the likelihood that its content receives a desired or specified number of impressions, for example, by entering into an agreement with a publisher 109, where the agreement requires the publisher 109 to provide at least a threshold number of impressions (e.g., 1,000 impressions) for a particular content item provided by the content provider 108 over a specified period (e.g., one week). In turn, the content provider 108, publisher 109, or both parties can provide data to the content management system 110 that enables the content management system 110 to facilitate satisfaction of the agreement.

For example, the content provider 108 can upload a content item and authorize the content management system 110 to provide the content item in response to requests for content corresponding to the website 104 of the publisher 109. Similarly, the publisher 109 can provide the content management system 110 with data representing the specified time period as well as the threshold number of impressions that the publisher 109 has agreed to allocate to the content item over the specified time period. Over time, the content management system 110 can select content items based at least in part on a goal of allocating at least a minimum number of impressions to a content item in order to satisfy a delivery goal for the content item during a specified period of time.

A content provider 108 or content sponsor can create a content campaign associated with one or more content items using tools provided by the content management system 110. For example, the content management system 110 can provide one or more account management user interfaces for creating and managing content campaigns. The account management user interfaces can be made available to the content provider 108, for example, either through an online interface provided by the content management system 110 or as an account management software application installed and executed locally at a content provider's client device.

A content provider 108 can, using the account management user interfaces, provide campaign parameters 120 which define a content campaign. The content campaign can be created and activated for the content provider 108 according to the parameters 120 specified by the content provider 108. The campaign parameters 120 can be stored in a parameters data store 122. Campaign parameters 120 can include, for example, a campaign name, a preferred content network for placing content, a budget for the campaign, start and end dates for the campaign, a schedule for content placements, content (e.g., creatives), bids, and selection criteria. Selection criteria can include, for example, a language, one or more geographical locations or websites, and/or one or more selection terms.

Some or all content items associated with a content provider 108 can be associated with contact information (e.g., a telephone number) of the content provider 108 or another designated entity. For example, a content item can include a control (e.g., a "call" button) for initiating a call to the content provider 108. A content provider 108 may desire to know which calls originated from or are a result of presentation of a specific content item. A solution of assigning a unique telephone number to each content item may not be practical since the number of content items provided by the content management system 110 may exceed a number of available telephone numbers.

Rather than associating a unique telephone number with each content item, a pool of telephone numbers can be used. For example, the control included in a content item can be configured to place a call, but not display a specific telephone number. The user can interact with (e.g., select or click) the control to initiate a call to the content provider 108 or other designated entity associated with the content item. In response to the control interaction, a request for a forwarding telephone number can be sent to a telephony system 123. The telephony system 123 can select an available forwarding number from a telephone number pool 124 and, in some implementations, can provide the selected forwarding number (for presentation or use) to the user device 106 of the user.

In some implementations, the user device 106 can initiate a call to the forwarding number and the call can be received by the telephony system 123. The telephony system 123 can route the call to the telephone number associated with the content provider 108 or the designated entity. The telephony system 123 can associate the impression of the content item with the call to the telephone number of the content provider 108, such as in a call data datastore 126.

The telephony system 123 can generate one or more reports which include information which indicates which calls to the content provider 108 or designated entity were generated from which content items. The one or more reports can be provided to the content provider 108, as illustrated by reports 128. While reference is made to contact information being of the form of a telephone number, other types of contact information can be managed in a pool and allocated as discussed further below.

Figure 2:
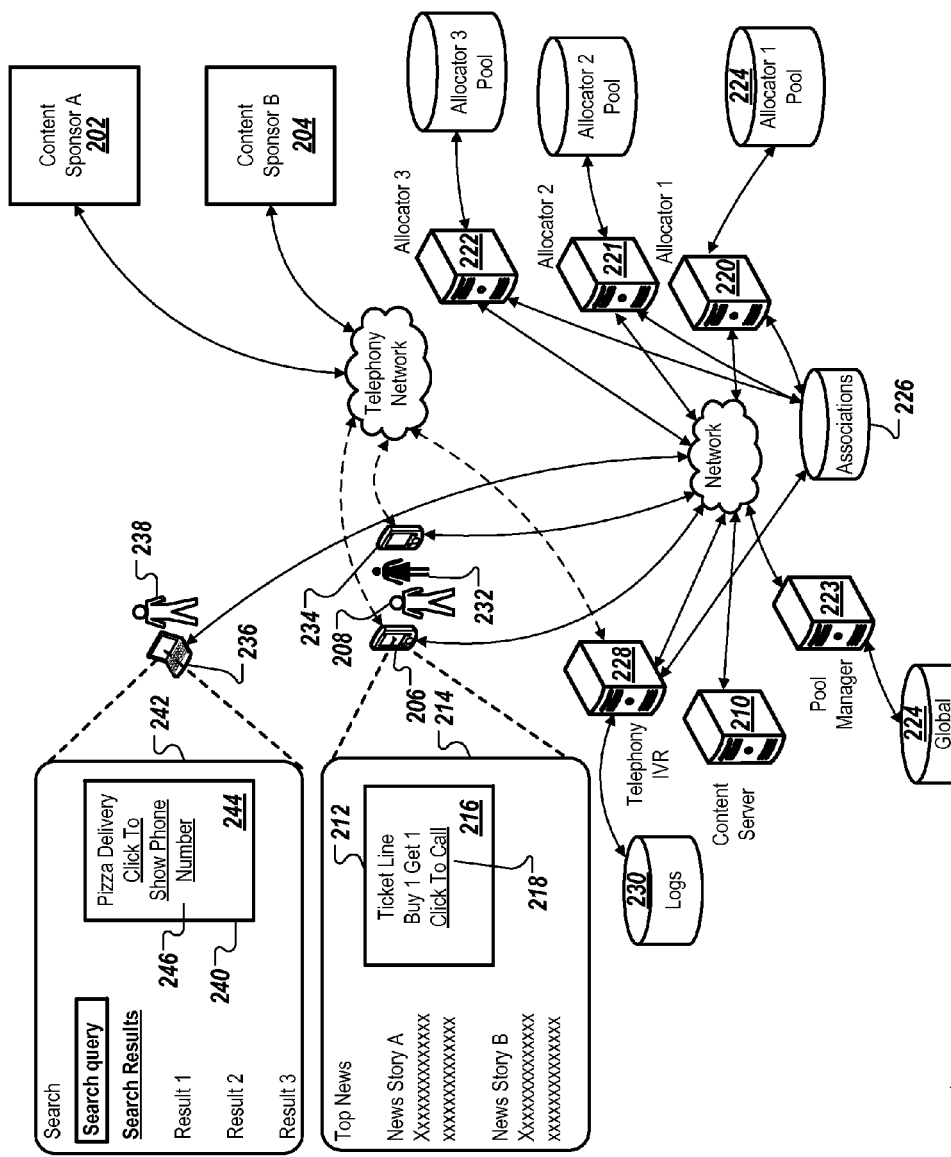
FIG. 2 is a block diagram of an example system for dynamic contact information assignment.

FIG. 2 is a block diagram of an example system 200 for dynamic contact information assignment. By way of example, the contact information described will be a telephone number. Content sponsors, such as content sponsors 202 and 204, may desire, as part of respective content campaigns, to track effectiveness of content items included in the respective content campaigns. For example, some or all content items included in a content campaign for the content sponsor 202 may be configured to facilitate a connection with (e.g., placing a call to) the content sponsor 202. The user, for example, can call the content sponsor 202 to make a purchase, inquire about a product or service, etc. The content sponsor 202 may desire to track, for example, how many calls to the content sponsor 202 are generated from presentation of each content item included in the content campaign and to track how many conversions (e.g., completed purchases) result from the calls generated from each content item.

A content item included in the content campaign of the content sponsor 202 can be provided to a user in response to a request for content from a user device. For example, a mobile user device 206 of a user 208 can send a request for content to a content server 210 for a content item to be presented in a content slot 212 of a web page 214 that is presented on the user device 206. The content server 210 can select a content item to be provided to the user device 206 and the selected content item can be presented in the content slot 212, as illustrated by a content item 216.

The content item 216 includes a control 218 for initiating a call to the content sponsor 202 or other designated entity. The user 208 can interact with (e.g., select or click) the control 218. In response to an interaction with the control 218, a request can be sent to an allocator server 220 for a forwarding telephone number. The request sent to the allocator server 220 can include a unique identifier (e.g., an impression identifier) corresponding to the presentation of the content item 216 in the content slot 212.

The allocator server 220 can be associated, for example, with the content sponsor 202 and possibly with other content sponsors. Other allocator servers, such as an allocator server 221 and an allocator server 222, can be associated with other content sponsors. A particular allocator server can be associated with one or more content sponsors and a particular content sponsor can be associated with one or more allocator servers. For example, a first allocator server, such as the allocator server 220, can process requests for forwarding telephone numbers associated with a first subset of content items associated with the content sponsor 202 and a second allocator server, such as the allocator server 221, can process requests for forwarding telephone numbers associated with a second subset of content items associated with the content sponsor 202. For example, the first subset of content items may be included in a first campaign associated with the content sponsor 202 and the second subset of content items may be included in a second campaign. Although the allocator servers 220, 221, and 222 are illustrated as separate servers, in some implementations, first, second, and third allocator processes can run on a single server.

A pool manager 223 can manage a global pool 224 of contact information (e.g., re-usable telephone numbers). Initially, all available telephone numbers can be assigned to the global pool 224. The pool manager 223 can allocate subsets of the available telephone numbers to each of the allocator servers 220, 221, and 222. Each of the allocator servers 220, 221, and 222 can further allocate their allocated telephone numbers to a group of content sponsors that are associated with a respective allocator server 220, 221, or 222. For example, each allocator server 220, 221, and 222 can allocate a portion of their allocated subset to each of the content sponsors associated with the respective allocator server 220, 221, or 222.

In response to the request for the forwarding telephone number, the allocator server 220 can select an available forwarding telephone number from an available number pool 225 managed by the allocator server 220. The available number pool 225 can include, among other forwarding telephone numbers, a set of forwarding telephone numbers that are available to be assigned to the content sponsor 202 in response to interaction with a control such as the control 218. The allocator server 220 can store a first type of association between the impression identifier associated with the impression of the content item 216, the selected forwarding telephone number, and a telephone number associated with the content sponsor 202, in an associations data store 226.

In some implementations, the allocator server 220 can send the selected forwarding telephone number to the user device 206. In some implementations, the user device 206 can automatically dial the forwarding telephone number in response to receiving the forwarding telephone number. In some implementations, the user device 206 can load a dialer on the user device 206, and using the received forwarding telephone number, initiate a call to the forwarding telephone number (e.g., by selecting a dial control on the user device 206). In some implementations, the user device 206 displays the forwarding telephone number and the user 206 enters the forwarding telephone number into the dialer and initiates a call to the forwarding telephone number. In some implementations, the telephony server 220 can place the call using the selected forwarding telephone number and connect the user device 206 to the call. Other dialing options are possible.

In some implementations, when the forwarding telephone number is dialed, the call is received by a telephony IVR (Interactive Voice Response) system 228. The telephony IVR system 228 bridges the call placed to the forwarding telephone number to a telephone number associated with the content sponsor 202 or designated entity. In response to receiving the call using the forwarding number, the allocator server 220 can store, in the associations data store 226, a second type of association between a caller identifier associated with the user device 206, the forwarding telephone number, and the telephone number of the content sponsor 202 or designated entity. A record of the call can be stored in a logs data store 230, and the record can include, for example, the impression identifier, the forwarding telephone number, an identifier of the content sponsor 202 or designated entity (e.g., the telephone number of the content sponsor 202), the caller identifier, a date and time of the call, and/or a call duration.

After the telephony IVR system 228 connects the call to the content sponsor 202 or designated entity, the allocator server 220 can return the forwarding telephone number to the available number pool 225, and the forwarding number can be assigned to an impression of another content item associated with the content sponsor 202, in response to a user interacting with a control in another content item. In some implementations, the telephony IVR system 228 maintains the second type of association between the caller identifier associated with the user device 206, the selected forwarding telephone number, and the telephone number of the content sponsor 202 for a predetermined period of time (e.g., ninety days to six months) after the telephony IVR system 228 connects the call to the content sponsor 202 or designated entity. Such an association can be maintained, for example, so that if the user 208 dials the forwarding number during the predetermined period of time, the call will connect to the content sponsor 202 or designated entity. This association allows for calls that are received from a caller having the stored caller identifier to be routed to the correct content sponsor (e.g. content sponsor 202) or designated entity even when the forwarding number has been potentially reassigned to one or more other content impressions that may be associated with one or more different content sponsors.

Over time, telephone numbers can be reclaimed from the available number pool 225, and can be reassigned either to another content sponsor associated with the allocator server 220 or to the pool manager 223 for reassignment to another allocator server such as the allocator server 221 or the allocator server 222. Telephone numbers can be reclaimed, for example, based on changes in demand or forecasted traffic for particular content items or for particular content sponsors. As another example, telephone numbers can be reclaimed from the available number pool 225 based on a determination that less than a threshold number of telephone numbers in the available number pool are currently assigned. In response to certain conditions, the allocator server 220 can request more telephone numbers from the pool manager 223. For example, the allocator server 220 can request more telephone numbers when more than a threshold number of telephone numbers in the available numbers pool 225 are currently assigned.

In some implementations, a content item configured to facilitate a connection to a content sponsor (e.g., the content sponsor 204) can be displayed on a user device which does not have calling capability (e.g., a laptop user device 236 of a user 238). For example, the user device 236 can send a request for content to the content server 210 for a content item to be presented in a content slot 240 of a web page 242 that is presented on the user device 236. The content server 210 can select a content item to be provided to the user device 236 and the selected content item can be presented in the content slot 240, as illustrated by a content item 244.

The content item 244 includes a control 246 for displaying a telephone number associated with the content sponsor 204. The user 238 can interact with (e.g., select or click) the control 246. In response to an interaction with the control 246, a request for a forwarding telephone number can be sent, for example, to the allocator server 221. For example, the allocator server 221 can be configured to process requests for forwarding telephone numbers associated with the content sponsor 204 (and possibly other content sponsors). The request sent to the allocator server 221 can include an impression identifier corresponding to the presentation of the content item 244 in the content slot 240.

The allocator server 221 can select an available forwarding telephone number from an available number pool 248. The allocator server 221 can store an association between the impression identifier associated with the impression of the content item 244, the forwarding telephone number selected in response to the request received from the user device 236, and a telephone number associated with the content sponsor 204, in the associations data store 226. The allocator server 221 can send the selected forwarding telephone number to the user device 206. The forwarding telephone number can be displayed in the content item 244, for example, in place of the "Click to Show Phone Number" text.

FIG. 3 is a flowchart of an example process 300 for allocation and reclaiming of telephone numbers. The process 300 can be performed, for example, by the telephony system 123 described above with respect to FIG. 1, or the system 200 described above with respect to FIG. 2.

A pool of available telephone numbers that can be assigned dynamically to one or more impressions as they are received is identified (302), wherein once assigned, a telephone number from the available telephone numbers provides a link of a subsequent call to the telephone number with a presentation of content associated with a specific impression.

All of the available telephone numbers in the pool are initially assigned to a pool manager (304). The pool manager can manage, for example, a global pool of available telephone numbers. For example, FIG. 4A illustrates a global pool 400 of available telephone numbers. An "N" displayed in the global pool 400 can represent an available telephone number or a block of available telephone numbers. The global pool 400 can include a set of available telephone numbers that are available for use to a content management system. Initially, all of the available telephone numbers managed by the pool manager can be assigned to the global pool 400.

Referring again to FIG. 3, initial subsets of the available telephone numbers are allocated, by the manager, to each of a plurality of allocator processes (306), wherein each allocator process is responsible for allocating telephone numbers to a group of content sponsors that are associated with a respective allocator process and wherein allocating by the manager includes allocating a first subset of the initial subsets to a first allocator process. The initial allocation by the manager can be less than all of the available telephone numbers in the pool. In some implementations, the initial allocation by the manager is uniform across the allocator processes. In some implementations, the initial allocation by the manager is based on a projected demand for each of the allocator processes, with an allocator process having a higher projected demand receiving a larger number of available telephone numbers than an allocator process having a lower projected demand.

For example, FIG. 4B illustrates a global pool 410 and first, second, and third allocator pools 420, 430, and 440, managed by first, second, and third allocator processes, respectively. The global pool 410 includes less available telephone numbers than the global pool 400 described above with respect to FIG. 4A, due to some of the available telephone numbers included in the global pool 400 being allocated to the first, second, and third allocator pools, respectively. In some implementations, the allocation of available telephone numbers by the pool manager is uniform across the allocator processes, as illustrated by each of the first, second, and third allocator pools 420, 430, and 440 each including a same number of available telephone numbers.

As another example and as illustrated in FIG. 4C, the allocation of available telephone numbers by the pool manager can be non-uniform. For example, the initial allocation by the pool manager can based on a projected demand for each of the allocator processes, with an allocator process having a higher projected demand receiving a larger number of available telephone numbers than an allocator process having a lower projected demand. For example, a different number of available telephone numbers are included in each of first, second, and third allocator pools 450, 460, and 470, respectively. For example, a first allocator process associated with the first allocator pool 450 can have a higher projected demand than a second allocator process associated with the second allocator pool 460.

Referring again to FIG. 3, a first allocation of the first subset is determined (308), by one or more processors, the first allocation being distributed among the content sponsors associated with the first allocator process, wherein the first allocation creates first pools each associated with a respective one of the content sponsors associated with the first allocator process.

The allocation by the first allocator process to the group of content sponsors can be less than all of the first subset allocated to the first allocator process. In some implementations, the allocation by the first allocator process to the group of content sponsors is uniform across the content sponsors. In some implementations, the allocation by the first allocator process to the group of content sponsors is based on projected demand for each respective content sponsor, with a content sponsor having a higher projected demand receiving a larger number of available telephone numbers than a content sponsor having a lower projected demand.

Figure 5:
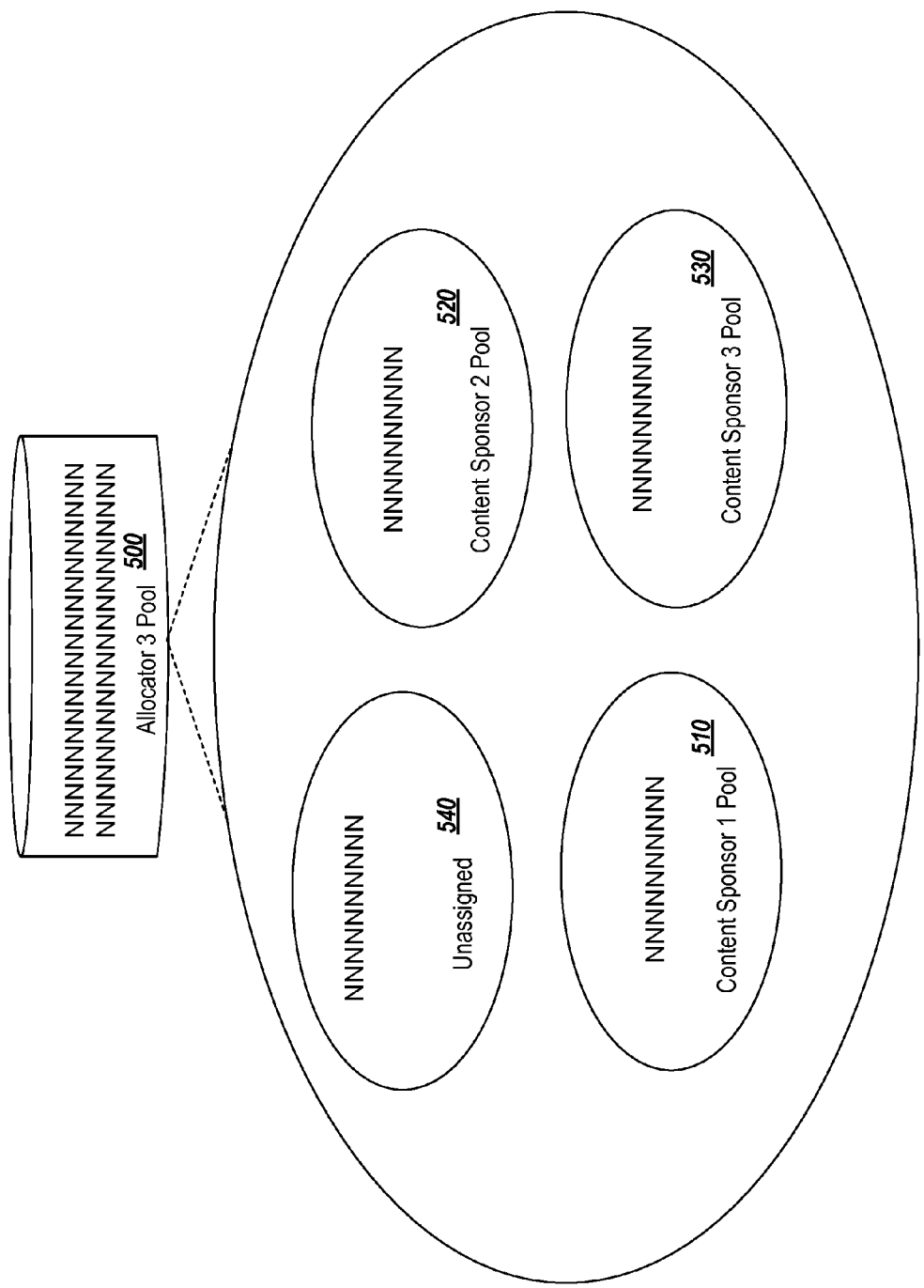
FIG. 5 illustrates an allocator pool.

For example, FIG. 5 illustrates an allocator pool 500. The allocator pool 500 can be managed, for example, by an allocator process. The allocator pool 500 includes first, second, and third subsets 510, 520, and 530, respectively. The first, second, and third subsets 510, 520, and 530 can each be associated with a particular content sponsor. For example, the allocator process can allocate a portion of the available telephone numbers in the allocator pool 500 to each of the content sponsors associated with the first allocator process. As illustrated by an unassigned portion 540, an initial allocation of available telephone numbers by the allocator process to the content sponsors can be less than all of the telephone numbers available to the allocator process. The allocation can be uniform across content sponsors, as illustrated by the first, second, and third subsets 510, 520, and 530 each including the same number of available telephone numbers. As another example, the allocation by the allocator process to the content sponsors can be based on projected demand for each respective content sponsor, with a content sponsor having a higher projected demand receiving a larger number of available telephone numbers than a content sponsor having a lower projected demand.

In some implementations, multiple allocator processes are responsible for allocating available telephone numbers to a particular content sponsor. For example, the first allocator process can be responsible for allocating available telephone numbers for a first set of campaigns associated with the content sponsor and a second allocator process can be responsible for allocating available telephone numbers for a second set of campaigns associated with the content sponsor.

In some implementations, one or more telephone numbers are reclaimed, based on one more criteria, from a pool of the first pools forming reclaimed telephone numbers (310). The one or more criteria can include, for example, changes in demand, changes in forecasted traffic or both. For example, when a downward change in demand or forecasted traffic is determined for a content sponsor, assigned telephone numbers included in a pool associated with the content sponsor can be reclaimed. As another example, the one or more criteria can include demand by a pool of the first pools for more telephone numbers wherein the demand is based on a threshold amount of telephone numbers in the pool being already assigned. For example, when more than the threshold amount of telephone numbers in the pool are assigned, a demand by the pool for more telephone numbers can be made to the allocator pool.

In some implementations, each pool of the first pools is monitored, including the monitoring of a number of telephone numbers that are assigned in each pool. A determination can be made to reclaim telephone numbers based on a number of telephone numbers that are assigned in each respective pool. For example, when more than a threshold number or more than a threshold percentage of telephone numbers in a particular pool are unassigned, some of the unassigned telephone numbers in the pool can be reclaimed. In some implementations, assigned telephone numbers are reclaimed, such as when an insufficient number of unassigned telephone numbers are available for reclaiming. For example, one or more telephone numbers can be reclaimed from a pool by determining previously assigned telephone numbers that were assigned a longest time ago in the past relative to other assigned telephone numbers in the pool.

Ones of the reclaimed telephone numbers are assigned by the first allocator process into either other pools of the first pools associated with the first allocator process or back to the pool manager for allocation to other allocator processes that are different from the first allocator process (312). Reclaiming and reassignment are discussed in more detail below with respect to FIGS. 6 and 7.

Figure 6:
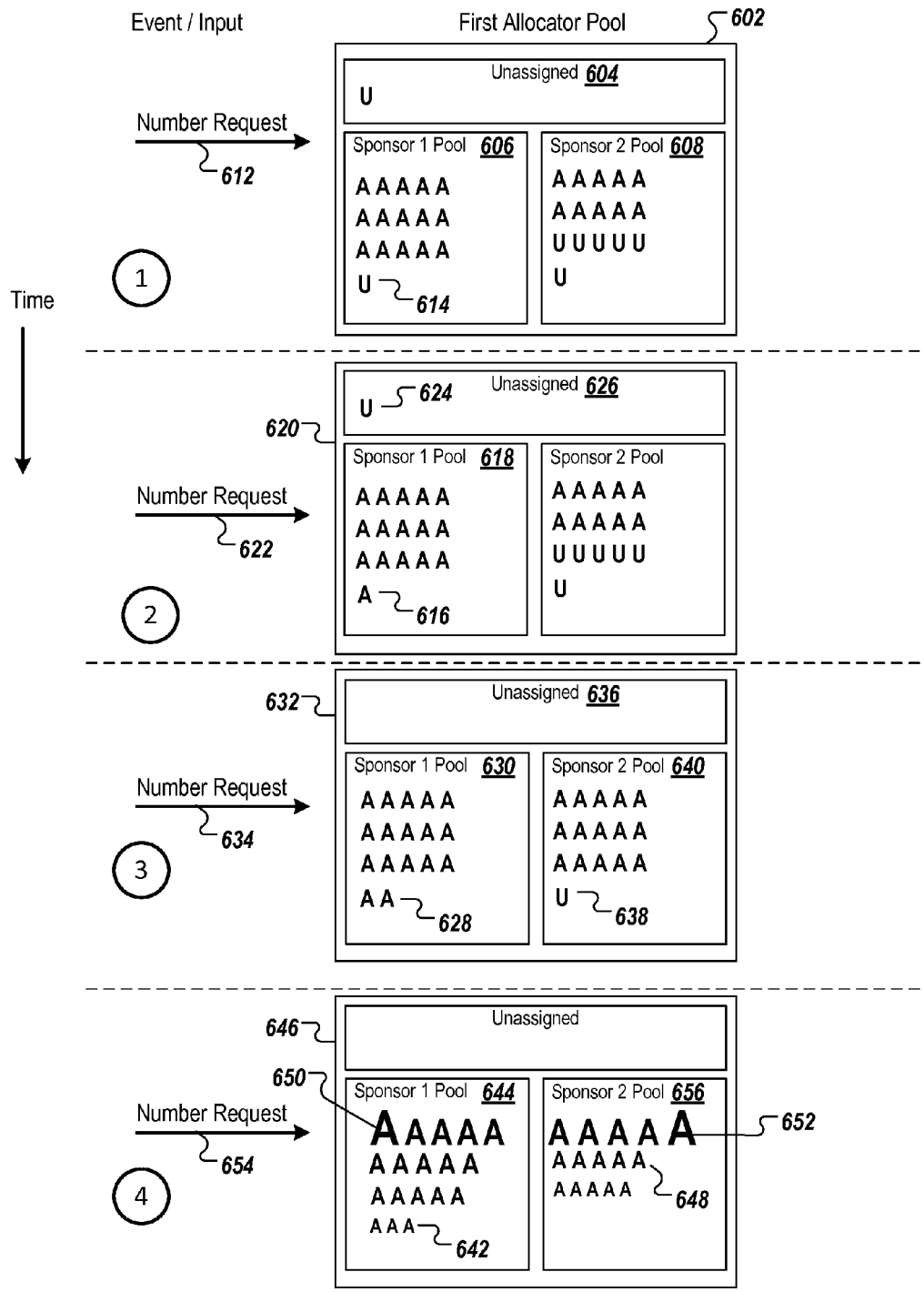
FIG. 6 illustrates the state of an allocator pool before and after the receipt of telephone number requests.

FIG. 6 illustrates the state of an allocator pool 602 before and after the receipt of telephone number requests. The allocator pool 602 includes a set of telephone numbers associated with a first allocator process. More specifically, the allocator pool 602 includes a set of unassigned telephone numbers 604 that have not been allocated to a particular content sponsor, and a first content sponsor pool 606 and a second content sponsor pool 608 that each include a set of telephone numbers that have been associated with a first content sponsor or a second content sponsor, respectively. In FIG. 6, a "U" inside of a pool indicates an unassigned telephone number, meaning a telephone number that has not been assigned to an impression or to an interaction with a call control. An "A" inside of a pool indicates a telephone number that has been assigned to an impression or to an interaction with a call control.

In a first stage, a first request 612 for a telephone number associated with the first content sponsor is received by the first allocator process. The first allocator process can identify an unassigned telephone number 614 in the first content sponsor pool 606 and can assign the unassigned telephone number 614 to an impression or to an interaction with a call control associated with the first request 612. The unassigned telephone number 614 can be marked as assigned, as illustrated by an assigned telephone number 616 included in a first content sponsor pool 618 of an allocator pool 620, in a second stage.

In the second stage, a second request 622 for a telephone number associated with the first content sponsor is received by the first allocator process. The first allocator process can determine that there are no unassigned telephone numbers in the first content sponsor pool 618. The first allocator process can identify an unassigned telephone number 624 in a set of unassigned telephone numbers 626 that have not been allocated to a particular content sponsor. The first allocator process can assign the unassigned telephone number 624 to an impression or to an interaction with a call control associated with the request 622. The first allocator process can mark the unassigned telephone number 624 as assigned and can associate the assigned telephone number with the first content sponsor, as illustrated by an assigned telephone number 628 included in a first content sponsor pool 630 of an allocator pool 632.

In the third stage, a third request 634 for a telephone number associated with the first content sponsor is received by the first allocator process. The first allocator process can determine that there are no unassigned telephone numbers in the first content sponsor pool 618 and also no available telephone numbers in an unassigned set 636. In some implementations, the first allocator process determines that there is an unassigned telephone number 638 allocated to the second content sponsor in a second content sponsor pool 640. The first allocator process can mark the unassigned telephone number 638 as assigned and can associate the assigned telephone number with the first content sponsor, as illustrated by an assigned telephone number 642 included in a first content sponsor pool 644 of an allocator pool 646.

In the fourth stage, telephone numbers included in a pool are displayed in varying sizes, with the size of a respective telephone number indicator representing an age of assignment, with the larger the size, the older the date of assignment. For example, the assigned telephone number 642 has a smaller size and thus a shorter assignment age than an assigned telephone number 648. Likewise, the assigned telephone number 648 has a smaller size and thus a shorter assignment age than assigned telephone numbers 650 and 652.

In the fourth stage, a fourth request 654 for a telephone number associated with the first content sponsor is received by the first allocator process. The first allocator process can determine that there are no unassigned telephone numbers available in the allocator pool 646. The first allocator process can reclaim an assigned telephone number and assign the reclaimed number to an impression or to an interaction with a call control associated with the fourth request 654. In some implementations, the first allocator process reclaims an assigned telephone number (e.g., the assigned telephone number 650) from the first content sponsor pool 644 that was assigned previously a longest time ago in the past relative to other assigned telephone numbers in the first content sponsor pool 644.

In some implementations, the first allocator process reclaims an assigned telephone number in either the first content sponsor pool 644 or a second content sponsor pool 656 that was assigned previously a longest time ago in the past relative to other assigned telephone numbers in the first content sponsor pool 644 and the second content sponsor pool 656. For example, if the assigned telephone number 652 was assigned before the assigned telephone number 650, the assigned telephone number 652 can be reclaimed. Although FIG. 6 illustrates the lack of unassigned numbers in both the allocator pool 646 and in the first content sponsor pool 644 and the second content sponsor pool 656, reclaiming and reallocating processes can be performed before such a situation occurs, to balance the number of available telephone numbers in allocator pools such as the allocator pool 646 and in content sponsor pools such as the first content sponsor pool 644 and the second content sponsor pool 656.

For example, FIG. 7 illustrates a global pool 702, a first allocator pool 704, and a second allocator pool 706 in various states over time. The global pool 702 includes unassigned telephone numbers that are available to be assigned to either a first allocator process that manages the first allocator pool 704 or a second allocator process that manages the second allocator pool 706. The first allocator pool 704 includes a first content sponsor pool 708 that includes telephone numbers that are associated with a first content sponsor, a second content sponsor pool 710 that includes telephone numbers that are associated with a second content sponsor, and an unassigned pool 712 which includes unassigned telephone numbers that have been allocated to the first allocator process but have not been associated with a particular content sponsor. Similarly, the second allocator pool 706 includes a third content sponsor pool 714 that includes telephone numbers that are associated with a third content sponsor, a fourth content sponsor pool 716 that includes telephone numbers that are associated with a fourth content sponsor, and an unassigned pool 718 which includes unassigned telephone numbers that have been allocated to the second allocator process but have not been associated with a particular content sponsor. Similar to FIG. 6, a "U" inside of a pool indicates an unassigned telephone number, meaning a telephone number that has not been assigned to an impression or to an interaction with a call control. An "A" inside of a pool indicates a telephone number that has been assigned to an impression or to an interaction with a call control.

The global pool 702, the first allocator pool 704, and the second allocator pool 706 can be monitored, and one or more rebalancing and/or reclaiming processes can be performed in response to various events, conditions, or inputs. For example, as illustrated in a first stage, the unassigned pool 712 can be monitored and a condition 719 can be detected that the number of telephone numbers in the unassigned pool 712 is below a threshold number. In response to such a detection, a request for more telephone numbers can be sent to a pool manager that manages the global pool 702. The pool manager can respond to the request by providing a set of telephone numbers to the first allocator process for inclusion in the unassigned pool 712, as illustrated, by an updated unassigned pool 720 associated with the first allocator process including more telephone numbers than the unassigned pool 712. As shown in the second stage, an updated global pool 722 includes less available telephone numbers than the global pool 702, reflecting the assignment of telephone numbers to the first allocator process.

In the first stage, a first traffic forecast 724 indicates that demand for telephone numbers for the third content sponsor may increase and a second traffic forecast 726 indicates that demand for telephone numbers for the fourth content sponsor may decrease. In response to the first traffic forecast 724 and the second traffic forecast 726, a set of telephone numbers may be reclaimed from the fourth content sponsor pool 716 and associated with the third content sponsor pool 714. For example, in the second stage, an updated fourth content sponsor pool 728 includes less unassigned telephone numbers than the fourth content sponsor pool 716 and an updated third content sponsor pool 730 includes more unassigned telephone numbers than the third content sponsor pool 714. Also in response to the first traffic forecast 724, a set of telephone numbers included in the unassigned pool 718 may be associated with the third content sponsor, as illustrated by an updated unassigned pool 732 including less telephone numbers than the unassigned pool 718 (e.g., some of the unassigned telephone numbers in the updated third content sponsor pool may have previously been included in the unassigned pool 718). In some implementations, in response to the second traffic forecast 726, some of the telephone numbers associated with the fourth content sponsor may be returned to the global pool 702.

In the second stage, e.g., after some time has elapsed, a condition 734 of the global pool 722 including less than a threshold number of available telephone numbers is determined. In response to the condition 734, the pool manager can send a request to the first allocator process and to the second allocator process to return telephone numbers to the global pool 722. The first allocator process can, for example, return some of the unassigned telephone numbers included in the unassigned pool 720. The second allocator process can determine that there are less than a threshold number of unassigned telephone numbers in a second allocator pool 736 (e.g., collectively or individually in the unassigned pool 732, the third content sponsor pool 730, and/or the fourth content sponsor pool 728). The second allocator process can identify in the fourth content sponsor pool 728 a set 740 of assigned telephone numbers that have been assigned previously a longest time ago in the past relative to other telephone numbers in the fourth content sponsor pool. The set 740 can be returned to the global pool 722, as illustrated by an updated global pool 742 and an updated fourth content sponsor pool 743, in a third stage.

In the third stage, a condition 744 of high activity in a first content sponsor pool 746 is detected. The first allocator process can request additional telephone numbers from the pool manager that manages the global pool 742 and the pool manager can provide additional telephone numbers for inclusion in the first content sponsor pool 746.

FIG. 8 is a flowchart of an example process 800 for dynamic telephone number assignment. The process 800 can be performed, for example, by the telephony system 123 described above with respect to FIG. 1 or the system 200 described above with respect to FIG. 2.

An impression is provided (802), including providing a content item for presentation on a device associated with a user, the content item including a control for initiating a call to a content sponsor associated with the content item. The device can be, for example, a mobile device with call-making capability. The content item can be, for example, an advertisement or some other type of content item. The control can be, for example, a button or a link. The button or link can include a caption which does not include a displayed telephone number.

A determination is made that the content sponsor is associated with a first pool (804). The first pool can include, for example, a plurality of telephone numbers which may or may not have been previously assigned to other content items associated with the content sponsor but are now available for assignment. A telephone number is assigned from the first pool to the content item (806), wherein assigning includes associating the telephone number with the content item.

An indication of an interaction with the control is received (808). For example, the user can select or click the control. In some implementations, the assigning of the telephone number to the content item can occur after the indication of an interaction with the control is received.

A connection is facilitated between the user and the content sponsor based on the interaction (810). For example, a call received from the device can be connected to a telephone number associated with the content sponsor or other designated entity.

An association is stored between an identifier associated with the user, the assigned telephone number and an identifier for the content sponsor such that future calls from the user to the telephone number can be routed to the content sponsor, even after the assigned telephone number has been returned to the first pool (812). The association can be maintained, for example, for a predetermined period of time (e.g., ninety days, six months).

An impression of the content item is linked with the connection such that a report can be generated that shows an effectiveness of the impression of the content item (814). The report can be provided on demand to the content sponsor and/or the report can be provided automatically on a periodic basis (e.g., monthly).

The assigned telephone number can be returned back to the first pool after a predetermined amount of time after the assignment to the content item. Assigned telephone numbers can be returned to the first pool in other situations. For example, an assigned telephone number can be returned in a situation where the telephone number is assigned to the content item at the time the content item is presented but no interaction with the control is received for a predetermined time.

Figure 9:
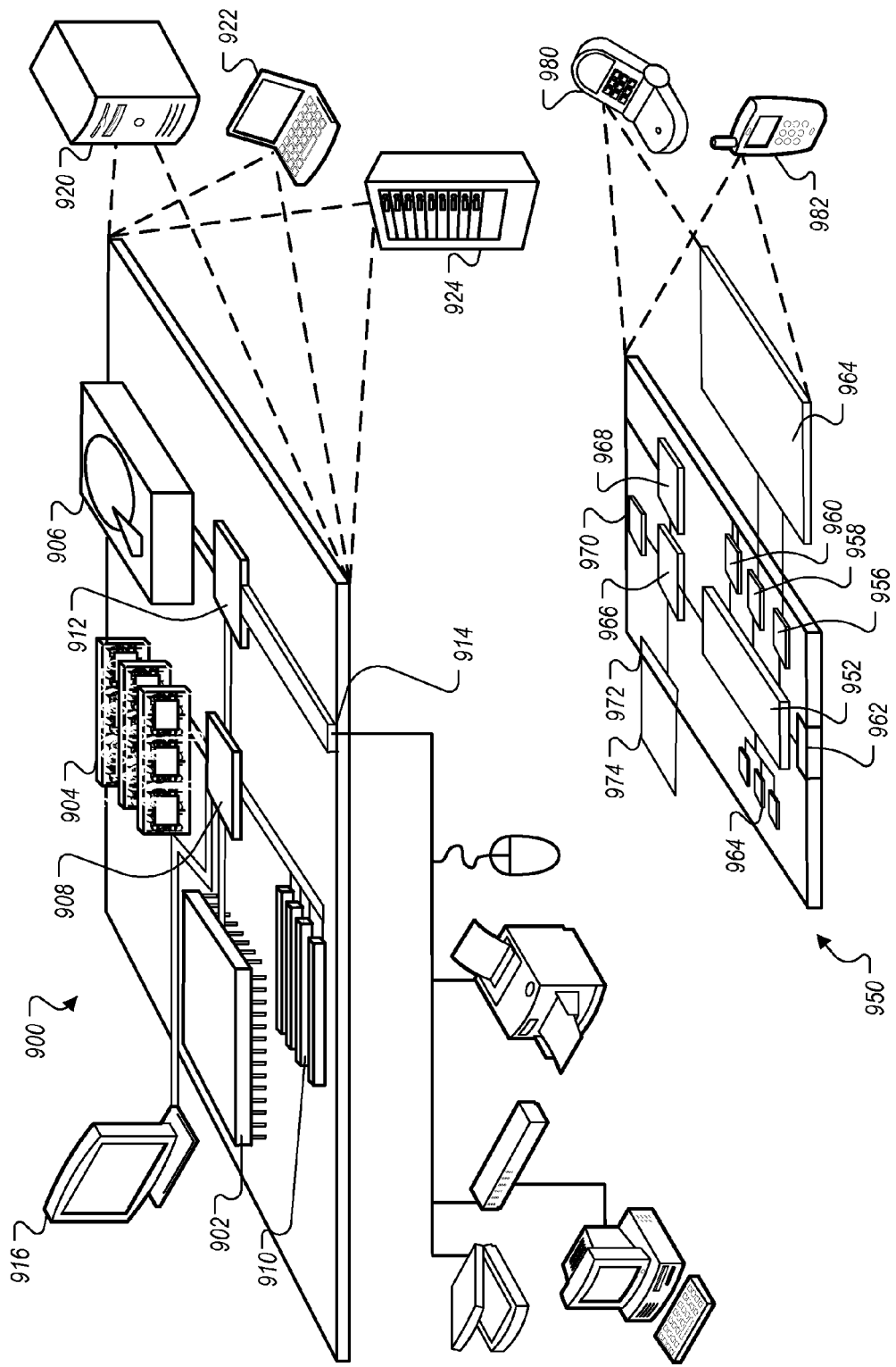
FIG. 9 is a block diagram of computing devices that may be used to implement the systems and methods described in this document, as either a client or as a server or plurality of servers.

FIG. 9 is a block diagram of computing devices 900, 950 that may be used to implement the systems and methods described in this document, as either a client or as a server or a plurality of servers. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be illustrative only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a computer-readable medium. The computer-readable medium is not a propagating signal. In one implementation, the memory 904 is a volatile memory unit or units. In another implementation, the memory 904 is a non-volatile memory unit or units.

The storage device 906 is capable of providing mass storage for the computing device 900. In one implementation, the storage device 906 is a computer-readable medium. In various different implementations, the storage device 906 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of duties is illustrative only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can process instructions for execution within the computing device 950, including instructions stored in the memory 964. The processor may also include separate analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD display or an OLED display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication (e.g., via a docking procedure) or for wireless communication (e.g., via Bluetooth or other such technologies).

The memory 964 stores information within the computing device 950. In one implementation, the memory 964 is a computer-readable medium. In one implementation, the memory 964 is a volatile memory unit or units. In another implementation, the memory 964 is a non-volatile memory unit or units. Expansion memory 974 may also be provided and connected to device 950 through expansion interface 972, which may include, for example, a SIMM card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS receiver module 970 may provide additional wireless data to device 950, which may be used as appropriate by applications running on device 950.

Device 950 may also communication audibly using audio codec 960, which may receive spoken information from a user and convert it to usable digital information. Audio codex 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A method comprising:
identifying a pool of available telephone numbers that can be assigned dynamically to impressions as they are received, wherein once assigned, a telephone number from the available telephone numbers providing a link of a subsequent call to the telephone number with a presentation of content associated with a specific impression;
initially assigning all of the available telephone numbers in the pool to a pool manager;
allocating by the manager, initial subsets of the available telephone numbers to each of a plurality of allocator processes, each allocator process responsible for allocating telephone numbers to a group of content sponsors that are associated with a respective allocator process, wherein allocating by the manager includes allocating a first subset of the initial subsets to a first allocator process;

determining, by one or more processors, a first allocation of the first subset, the first allocation being distributed among the content sponsors associated with the first allocator process, wherein the first allocation creating first pools each associated with a respective one of the content sponsors associated with the first allocator process;

based on one more criteria, reclaiming one or more telephone numbers from a pool of the first pools forming reclaimed telephone numbers; and assigning ones of the reclaimed telephone numbers by the first allocator process into either other pools of the first pools associated with the first allocator process or back to the pool manager for allocation to other allocator processes that are different from the first allocator process.

2. The method of claim 1 wherein the allocating by the manager of the initial subsets is less than all of the available telephone numbers in the pool.

3. The method of claim 1 wherein the allocating by the manager of the initial pools is based on a projected demand for each of the allocator processes.

4. The method of claim 1 wherein the allocating by the manager of the initial pools is uniform across the allocator processes.

5. The method of claim 1 wherein the first allocation by the first allocator process to the group of content sponsors associated with the first allocator process is less than all of the first subset.

6. The method of claim 1 wherein the first allocation by the first allocator process to the group of content sponsors associated with the first allocator process is based on projected demand for each respective content sponsor.

7. The method of claim 1 wherein the first allocation by the first allocator process to the group of content sponsors associated with the first allocator process is uniform across the content sponsors.

8. The method of claim 1 further comprising assigning more telephone numbers to a pool of the first pools from the reclaimed telephone numbers.

9. The method of claim 1 further comprising monitoring each pool of the first pools and determining when to reclaim telephone numbers based on a number of telephone numbers that are assigned in each respective pool.

10. The method of claim 1 further comprising monitoring each pool in the first pools and wherein the method further comprises requesting more telephone numbers from the manager when insufficient numbers of reclaimed telephone numbers are available to the first allocator process for reassignment in the first pools.

11. The method of claim 1 further comprising monitoring a pool in the first pools and wherein the method further comprises requesting more telephone numbers from the manager when insufficient numbers of reclaimed telephone are available to the first allocator process for reassignment to the pool of the first pools or when overall pool activity is above a predetermined threshold for the first allocator process.

12. The method of claim 1 wherein reclaiming a telephone number from the pool includes reclaiming a telephone number that is currently assigned and was assigned previously a longest time ago in the past relative to other assigned telephone numbers in the pool.

13. The method of claim 1 further comprising providing an impression including providing a content item for presentation on a device associated with a user, the content item including a control for initiating a call to a content sponsor associated with the content item;

determining that the content sponsor is associated with the first pool;

assigning a telephone number from the first pool to the content item, wherein assigning includes associating the telephone number with the content item;

receiving an indication of an interaction with the control;

facilitating a connection between the user and the content sponsor based on the interaction;

storing an association between an identifier associated with the user, the assigned telephone number and an identifier for the content sponsor such that future calls from the user to the telephone number can be routed to the content sponsor, even after the assigned telephone number has been returned to the first pool; and linking an impression of the content item with the connection such that a report can be generated that shows an effectiveness of the impression of the content item.

14. The method of claim 13 wherein the first pool includes a plurality of telephone numbers which may or may not have been previously assigned to other content items associated with the content sponsor but are now available for assignment.

15. The method of claim 14 further comprising returning the assigned telephone number back to the first pool after either a predetermined amount of time after assignment to a content item, or after a pre-determined amount of time after assignment without receipt of an interaction by a user.

16. The method of claim 13 wherein the assigning occurs after receiving the indication of the interaction with the control.

17. A computer program product tangibly embodied in a computer-readable storage device and comprising instructions that, when executed by a processor, cause the processor to:

identify a pool of available telephone numbers that can be assigned dynamically to impressions as they are received, wherein once assigned, a telephone number from the available telephone numbers providing a link of a subsequent call to the telephone number with a presentation of content associated with a specific impression;

initially assign all of the available telephone numbers in the pool to a pool manager;

allocate by the manager, initial subsets of the available telephone numbers to each of a plurality of allocator processes, each allocator process responsible for allocating telephone numbers to a group of content sponsors that are associated with a respective allocator process, wherein allocating by the manager includes allocating a first subset of the initial subsets to a first allocator process;

determine a first allocation of the first subset, the first allocation being distributed among the content sponsors associated with the first allocator process, wherein the first allocation creating first pools each associated with a respective one of the content sponsors associated with the first allocator process;

based on one more criteria, reclaim one or more telephone numbers from a pool of the first pools forming reclaimed telephone numbers; and assign ones of the reclaimed telephone numbers by the first allocator process into either other pools of the first pools associated with the first allocator process or back to the pool manager for allocation to other allocator processes that are different from the first allocator process.

18. The product of claim 17 wherein the one or more criteria include changes in demand, changes in forecasted traffic or both.

19. The product of claim 18 wherein the one or more criteria include demand by a pool of the first pools for more telephone numbers wherein the demand is based on a threshold amount of telephone numbers in the pool of the first pools being already assigned.

20. A system comprising:
one or more processing devices; and
one or more storage devices storing instructions that, when executed by the one or more processing devices, cause the one or more processing devices to:
identify a pool of available telephone numbers that can be assigned dynamically to impressions as they are received wherein once assigned, a telephone number from the available telephone numbers provides a link of a subsequent call to the telephone number with a presentation of content associated with a specific impression;
initially assign all of the available telephone numbers in the pool to a pool manager;
allocate, by the pool manager, initial subsets of the available telephone numbers to each of a plurality of allocator processes, each allocator process responsible for allocating telephone numbers to a group of content sponsors that are associated with a respective allocator process, wherein allocating by the pool manager includes allocating a first subset of the initial subsets to a first allocator process;
determine a first allocation of the first subset, the first allocation being distributed among the content sponsors associated with the first allocator process, wherein the first allocation creates first pools each associated with a respective one of the content sponsors associated with the first allocator process;
based on one more criteria, reclaim one or more telephone numbers from a pool of the first pools associated with the first allocator process forming reclaimed telephone numbers; and
assign ones of the reclaimed telephone numbers by the first allocator process into either other pools of the first pools associated with the first allocator process or back to the pool manager for allocation to other allocator processes that are different from the first allocator process.

* * * * *